Patented Mar. 19, 1929.

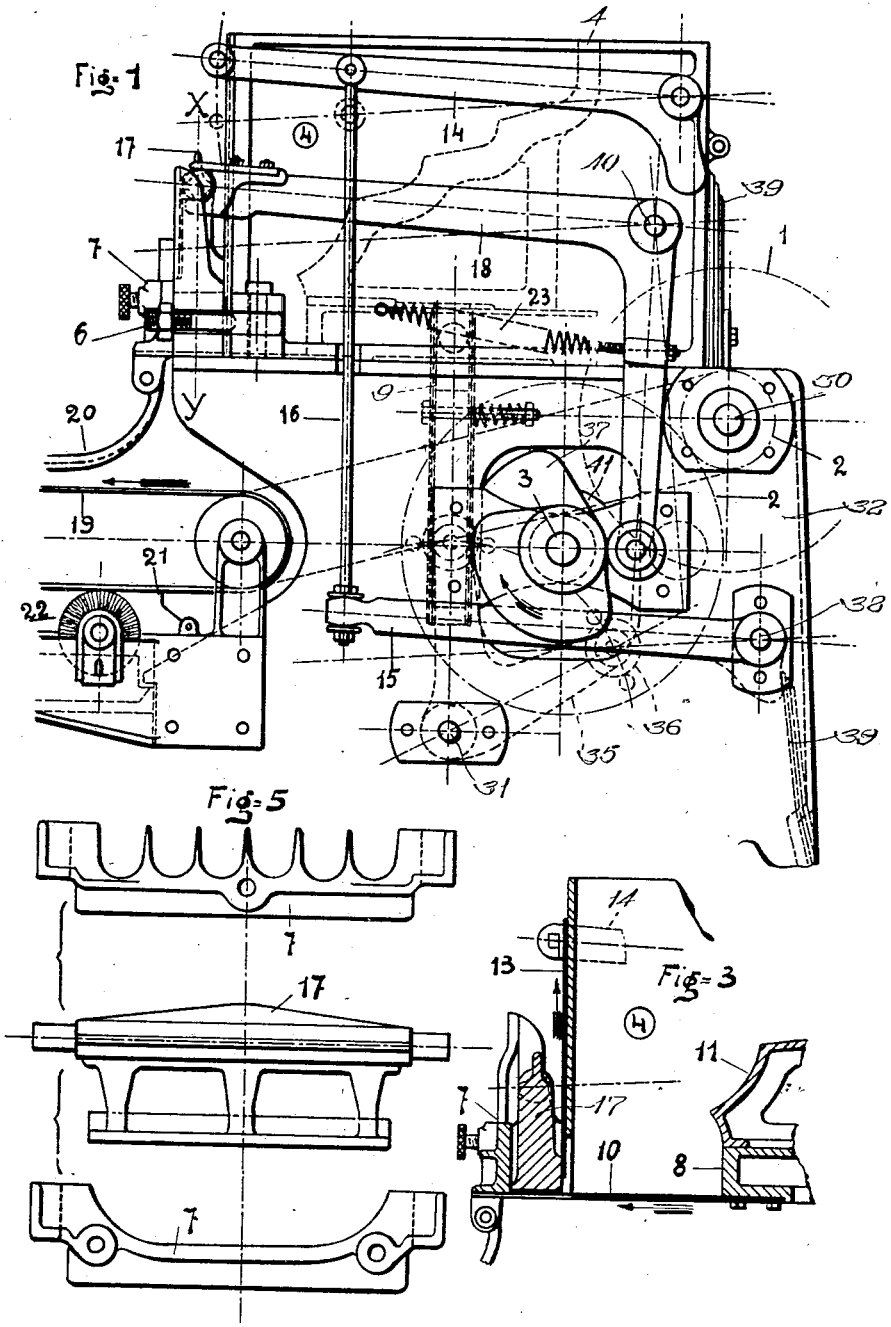

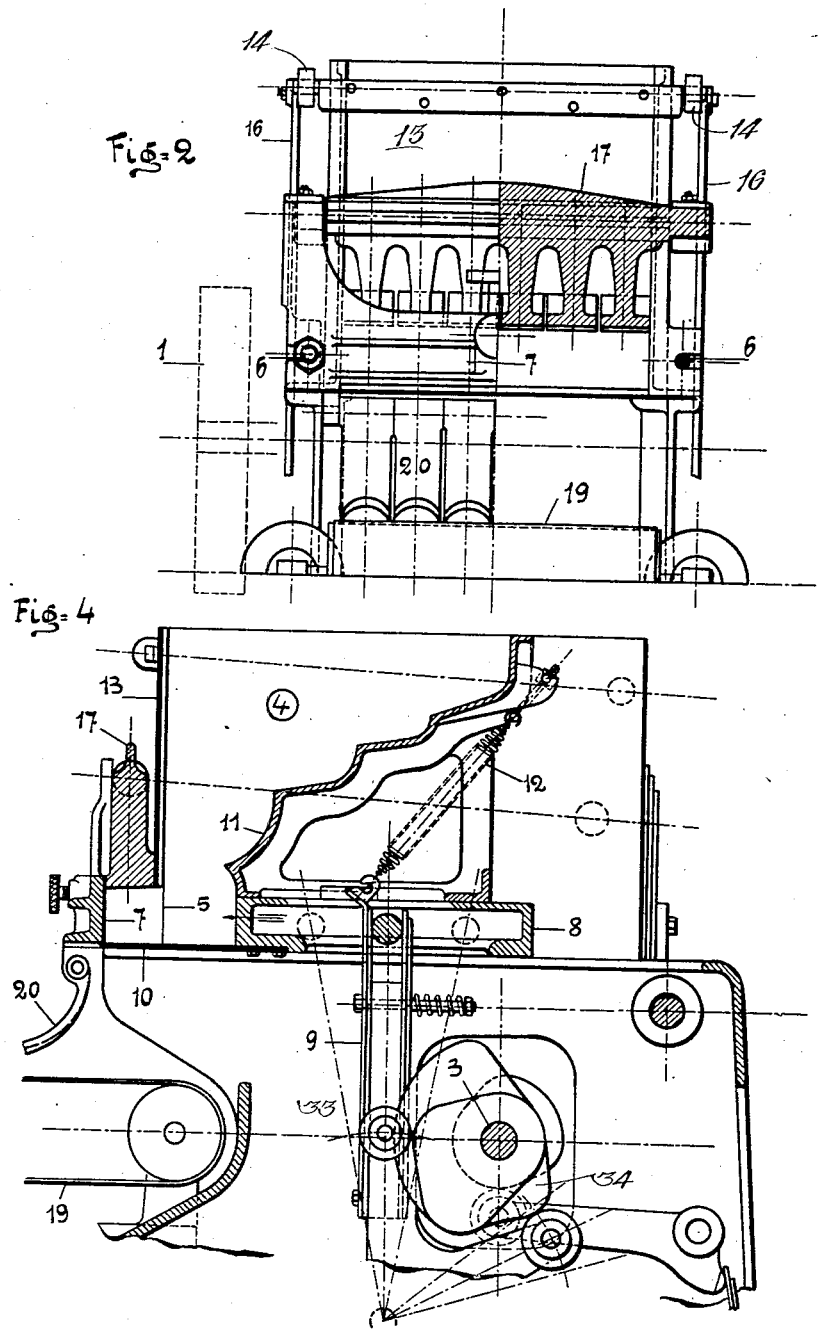

1,706,127

UNITED STATES PATENT OFFICE.

EZIO PENSOTTI, OF MILAN, ITALY.

MACHINE FOR MOLDING BAKER'S DOUGH INTO LOAVES OR CAKES.

Application filed June 9, 1924, Serial No. 718,990, and in Italy December 27, 1923.

This invention has for its object to provide an improved machine for mechanically molding baker's dough into cakes or loaves all of one and the same weight which may be varied as desired.

Several types of machines designed for this purpose have already been proposed, but none has come into extensive use in practice owing to various drawbacks.

An improved machine according to the present invention is illustrated by way of example in the accompanying drawings wherein:—

Figure 1 is a side elevation of the entire machine.

Figure 2 is a front elevation thereof, the right hand half of the figure being shown in section taken along the line X—Y of Figure 1.

Figure 3 is a partial longitudinal section of the left hand upper part of the improved machine.

Figure 4 is a similar, but more complete section of the improved machine.

Figure 5 illustrates two forms of mold and a spare ejector in the machine for the different sizes of loaves.

The improved machine is driven by power by means of the pulley 1 carried by a shaft 30 driving a shaft 3 through the medium of two intermeshing toothed wheels 2, 2. The shaft 3 carries cams for actuating the levers driving the various parts that effects the division of the dough into loaves and the ejection of the latter from the molds as will be hereinafter more fully described.

The kneaded dough is charged in lumps of suitable size into the hopper 4 which is made of sheet iron or other metal or parallelopipedal form, and has fixed side walls.

The front wall of the hopper 4 is likewise fixed, and in it is a rectangular aperture 5 extending throughout the width of its lower part. In front of this aperture the mold 7 is removably secured by means of two lateral bolts 6. The right hand rear wall of the hopper is constituted by a slide 8 adapted to move horizontally to-and-fro and a member 11. This slide is actuated by a flexible lever 9, and it carries in front on its underside a plate 10 which constitutes the movable bottom of the front part of the hopper. On the slide there is arranged the stepped member 11 which is carried along with the slide by means of two coiled springs 12. This member 11 is adapted to yield to a pressure greater than the tension of the springs 12 and under such conditions remains stationary while the slide continues moving forwardly.

Along the front wall of the hopper there is adapted to move to-and-fro vertically a knife blade 13 operated by two pairs of levers 14 and 15 and two rods 16, and in front of this knife there is arranged an ejector 17 moved vertically by a pair of bell-crank levers 18 which has the function of expelling from the mold the loaves that are compressed and molded therein. As will be understood, the type of ejector must be changed to suit the type of mold.

In the practical embodiment of the invention illustrated the flexible lever 9 as pivotally mounted at 31 in the supporting frame structure 32 of the machine and is provided with a roller 33 coacting with a cam 34 on the shaft 3 and with a short arm 35 carrying a roller 36 also coacting with said cam. In this manner reciprocating movement is imparted to the slide 8 through the oscillating movement of the lever 9. The cutting stroke of the knife 13 is effected incident to depression of the levers 14 and 15 which is effected by a cam 37 acting against the lever 15 which latter is pivotally mounted at 38 in the frame 32. The ascending movement of the knife is effected by springs 39 acting against the levers 14 and 15. The bell crank levers 18 actuating the mold 17 are pivotally secured at 40 to the sides of the hopper 4 and are actuated in one direction to withdraw the ejector from the mold by the tension of springs 23. The descending movement of the ejector is effected by a cam 41 on the shaft 3.

The operation of the improved machine is as follows: At starting, the slide 8 and the stepped compressor 11 are both situated at the right hand side of the machine, the knife 13 and the ejector 17 are in their highest positions, and the hopper is charged with dough; the compressor then advances towards the left hand side and forces the dough from the hopper into the compartments of the mold, the stepped formation of the face of the compressor facilitating the descent of the dough. At a certain point of its course the compressor encounters an obstacle or resistance, and it stops, but the lever completes its course by reason of its flexibility, the knife descends and cuts off the loaves that have been compressed in the mold compartments from the mass of dough remaining in the hopper; and then the compressor moves back together with its bottom plate which uncovers the underside of the mold compartments, and finally the ejector descends and ejects the loaves contained in the mold compartments in the downward direction so that they fall on to an endless conveyor band 19 which, in moving forwards causes the loaves to roll underneath tongues 20 which are recessed on their undersides, whereby the loaves are rounded. 21 is a scraper, and 22 is a brush, provided for the purpose of cleaning the endless conveyor band 19.

What I claim is:—

1. In a machine of the character described, a hopper, a compressor reciprocally mounted in the hopper composed of two parts superimposed one upon the other, spring means connecting the two parts together, a flexible actuating lever for the compressor, a removable and interchangeable mold arranged to receive materials from the hopper, a cutting blade adapted to sever the materials ejected from the hopper from that remaining therein, and means for ejecting material from the mold.

2. A machine as claimed in claim 1, in which the compressor comprises a slide connected with the flexible lever, a stepped member movably mounted on the slide and spring means normally resisting relative movement of the slide and stepped member.

In testimony whereof I have signed my name to this specification.

EZIO PENSOTTI.